US008193974B2

(12) United States Patent
Logan et al.

(10) Patent No.: US 8,193,974 B2
(45) Date of Patent: Jun. 5, 2012

(54) SYSTEMS AND METHODS FOR SUPPRESSING AMBIGUOUS PEAKS FROM STEPPED FREQUENCY TECHNIQUES

(75) Inventors: Gloria Logan, Woodinville, WA (US); Brennan Kilty, Seattle, WA (US); Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 600 days.

(21) Appl. No.: 12/398,025

(22) Filed: Mar. 4, 2009

(65) Prior Publication Data

US 2012/0112952 A1    May 10, 2012

(51) Int. Cl.
    *G01S 13/18*    (2006.01)
(52) U.S. Cl. .......... 342/203; 342/94; 342/136; 342/159; 342/173
(58) Field of Classification Search .................... 342/203
    See application file for complete search history.

(56) References Cited

U.S. PATENT DOCUMENTS

| 3,573,820 | A | * | 4/1971 | Bohacek | 342/91 |
| 3,889,199 | A | * | 6/1975 | Gutleber | 327/178 |
| 4,507,659 | A | * | 3/1985 | Lewis et al. | 342/201 |
| 4,901,082 | A |   | 2/1990 | Schreiber et al. | |
| 5,103,233 | A | * | 4/1992 | Gallagher et al. | 342/408 |
| 5,151,702 | A | * | 9/1992 | Urkowitz | 342/134 |
| 5,173,706 | A | * | 12/1992 | Urkowitz | 342/99 |
| 5,245,587 | A |   | 9/1993 | Hutson | |
| 5,302,955 | A | * | 4/1994 | Schutte et al. | 342/59 |
| 5,309,161 | A | * | 5/1994 | Urkowitz et al. | 342/132 |
| 5,379,268 | A |   | 1/1995 | Hutson | |
| 5,394,151 | A |   | 2/1995 | Knaell et al. | |
| 5,414,428 | A |   | 5/1995 | Gallagher et al. | |
| 5,440,311 | A |   | 8/1995 | Gallagher et al. | |
| 5,455,806 | A |   | 10/1995 | Hutson | |
| 5,481,270 | A | * | 1/1996 | Urkowitz et al. | 342/101 |
| 5,646,623 | A |   | 7/1997 | Walters et al. | |
| 5,786,788 | A | * | 7/1998 | Schober et al. | 342/159 |
| 5,808,580 | A | * | 9/1998 | Andrews, Jr. | 342/162 |
| 6,078,281 | A |   | 6/2000 | Milkovich et al. | |
| 6,538,597 | B1 |   | 3/2003 | Steudel | |
| 6,608,586 | B1 |   | 8/2003 | Doerry | |

(Continued)

FOREIGN PATENT DOCUMENTS

JP    58195172 A    *    11/1983

(Continued)

OTHER PUBLICATIONS

Hu et al. "Study on Non-linear Stepped Chirp Radar System". International Conference on Communications, Circuits, and Systems. May 25-27, 2008. pp. 881-885.*

(Continued)

*Primary Examiner* — Thomas Tarcza
*Assistant Examiner* — Matthew M Barker
(74) *Attorney, Agent, or Firm* — Lowe Graham Jones PLLC (57) ABSTRACT

Signal compensation systems and methods compensate an estimated range profile from a plurality of detected signal returns from a true range profile, wherein the signal returns correspond to an emitted stepped frequency pulse-train. An exemplary embodiment utilizes knowledge of the radar system design to identify locations, predict power levels, and suppress the contributions of stepped-frequency range sidelobes (ambiguous peaks) in the estimated range profile, resulting in a cleaner and more accurate radar display.

19 Claims, 3 Drawing Sheets

U.S. PATENT DOCUMENTS

| | | | |
|---|---|---|---|
| 6,864,827 B1 | 3/2005 | Tise et al. | |
| 6,940,450 B2 * | 9/2005 | Blunt et al. | 342/195 |
| 7,019,686 B2 | 3/2006 | Hester et al. | |
| 7,106,250 B2 * | 9/2006 | Blunt et al. | 342/195 |
| 7,298,315 B2 * | 11/2007 | Gerlach et al. | 342/159 |
| 7,375,676 B1 | 5/2008 | Loberger | |
| 7,439,906 B1 * | 10/2008 | Blunt et al. | 342/195 |
| 7,474,257 B2 * | 1/2009 | Blunt et al. | 342/159 |
| 7,535,412 B1 * | 5/2009 | Blunt et al. | 342/179 |
| 7,589,666 B2 | 9/2009 | Passarelli, Jr. et al. | |
| 7,602,331 B2 * | 10/2009 | Blunt et al. | 342/159 |
| 2004/0227659 A1 | 11/2004 | Woodford et al. | |
| 2005/0195103 A1 | 9/2005 | Davis et al. | |
| 2005/0225481 A1 | 10/2005 | Bonthron | |
| 2006/0140249 A1 | 6/2006 | Kohno | |
| 2007/0040729 A1 | 2/2007 | Ohnishi | |
| 2007/0285315 A1 | 12/2007 | Davis et al. | |
| 2008/0111734 A1 | 5/2008 | Fam et al. | |
| 2008/0129584 A1 | 6/2008 | Antonik et al. | |

FOREIGN PATENT DOCUMENTS

JP     2009128278 A   *   6/2009

OTHER PUBLICATIONS

Jenho Tsao and Bernard D. Steinberg, Reduction of Sidelobe and Speckle Artifacts in Microwave Imaging: The Clean Technique, IEEE Transactions on Antennas and Propagation, vol. 36, No. 4, Apr. 1988, pp. 543-556.

* cited by examiner

SYSTEMS AND METHODS FOR SUPPRESSING AMBIGUOUS PEAKS FROM STEPPED FREQUENCY TECHNIQUES

BACKGROUND OF THE INVENTION

A pulsed radar system emits a pulsed signal, or a series of pulsed signals, in a predefined direction from its antenna. The path illuminated by the radar beam, determined by the characteristics of the antenna, is referred to as the range profile. When a pulse of radio frequency (RF) energy is emitted from the transmitter and out the antenna, objects in the range profile incident to the transmission scatter a portion of the transmitted energy back in the direction of the radar, and the receiver detects the reflected signal returns. The radar processing system then determines an estimate of the range profile consisting of a plurality of range bins. Traditionally, in a pulsed system, the time delay between the transmission and reception of the radar signal determines the range to the object and the length of the pulse emitted pulse determines range resolution. The range corresponds to the distance from the radar system, and the range resolution corresponds to the ability to distinguish between objects in range.

The emitted radar signal waveforms are becoming increasingly more complex in an effort to reduce transmission power while improving sensitivity, accuracy, and resolution. One method is to emit a single pulse defined by a variable frequency, referred to as a frequency modulated or pulse compression waveform which in combination with a matched pulse compression filter at the receiver will significantly improve the signal to noise ratio (SNR) by allowing for longer pulses to be emitted while keeping range resolution reasonably high and transmit power low. Another improvement is to emit a series of single frequency sub-pulses, referred to as a pulse-train, over a relatively longer predefined time period. The returns from these sub-pulses can also be combined to improve SNR. However, if the center frequencies of the sub-pulses within the pulse-train have been intelligently stepped, the returns can be combined to increase the effective bandwidth of the radar, resulting in an increased range resolution. The latter is referred to as a stepped frequency waveform or stepped frequency pulse-train. Yet another improvement is to combine the stepped frequency and pulse compression methods by emitting a series of pulses defined by a variable frequency and stepped center frequencies over a relatively longer predefined time period, referred to as a pulse compressed stepped frequency pulse-train or waveform.

Unfortunately, with the improvements in detection sensitivity and range resolution, any pulse compression method adds undesirable artifacts to the estimated range profile. These artifacts are generally referred to as range sidelobes as they appear as returns up-range and down-range of true objects in the estimated range profile. For stepped frequency, the range sidelobes are called ambiguous peaks, and typically a small number of these ambiguous peaks result when conventional stepped frequency pulse-trains and processing methods are employed. When pulse compressed stepped frequency pulse-trains are used, the pulse compression and stepped frequency range sidelobe artifacts combine which results in the generation of many ambiguous peaks over up-range and down-range for distances equal to the uncompressed pulse length. Thus, the radar display is cluttered and it becomes more difficult to discriminate true object returns from signal processing artifacts, particularly as the complexity of the range profile increases. Therefore, it is desirable to minimize ambiguous peaks.

SUMMARY OF THE INVENTION

Systems and methods of compensating for artifacts introduced in an estimated range profile determined using stepped-frequency methods are disclosed. An exemplary embodiment utilizes knowledge of the radar system design to identify locations, predict power levels, and suppress the contributions of stepped-frequency range sidelobes (ambiguous peaks) in the estimated range profile, resulting in a cleaner and more accurate radar display. The systems and methods of compensating for artifacts suppresses ambiguous peaks resulting from any stepped frequency waveform, including pulse compressed stepped frequency waveforms.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
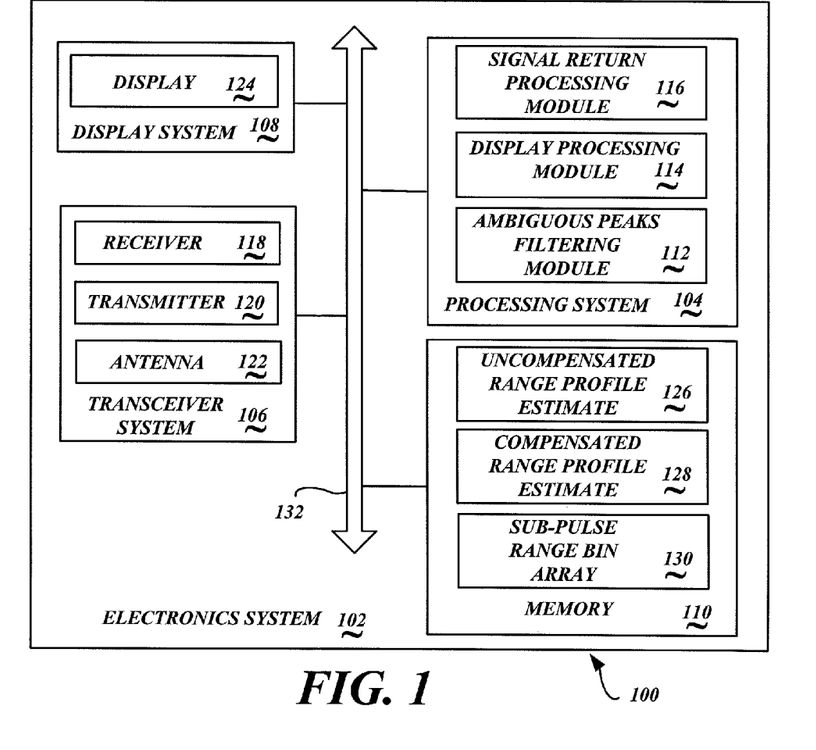
FIG. 1 is a block diagram of an exemplary embodiment of the stepped frequency ambiguous peaks compensation system.

FIG. 1 is a block diagram of an exemplary embodiment of a stepped frequency ambiguous peaks compensation system 100 implemented in an electronics system 102 of an installation (not shown). The electronics system 102 includes a processing system 104, a RF transceiver system 106, a display system 108, and a memory 110. The transceiver system 106 includes a receiver 118 operable to measure radar returns, transmitter 120 that is operable to emit radar signals, and an antenna 122. The display system 108 includes a display 124. It is appreciated that the electronics system 102 may include many other components and/or systems that are not illustrated or described herein.

The above-described components, in an exemplary embodiment, are communicatively coupled together via communication bus 132. In alternative embodiments of the electronics system 102, the above-described components may be communicatively coupled to each other in a different manner. For example, one or more of the above-described components may be directly coupled to the processing system 104, or may be coupled to the processing system 104 via intermediary components (not shown).

A signal source, such as transmitter 120, emits a pulse-train comprised of a plurality of stepped frequency sub-pulses directed by the antenna 122. An exemplary embodiment is the transceiver system 106 that emits radar pulses and receives radar returns. The transceiver system 106 may be any suitable radar system, such as, but not limited to, a radar system that is operable to detect objects that are located relatively far away from the installation in which the transceiver system 106 resides. A radar return is reflected energy from an object upon which the emitted radar pulse is incident on.

The antenna 122 directs the radar signal in directions of interest, such that the transceiver system 106 is able to detect objects in an area of interest about the installation. Embodiments of the stepped frequency ambiguous peaks compensation system 100 may be implemented in a variety of types and/or applications of radar including mobile or fixed installations.

An exemplary embodiment of the stepped frequency ambiguous peaks compensation system 100 comprises a plurality of cooperatively acting modules. The modules are identified as a signal return processing module 116, a display processing module 114, and an ambiguous peaks filtering module 112. Modules 112, 114, 116 reside in the processing system 104. In other embodiments, the modules 112, 114, 116 may be implemented together as a common module, may be integrated into other modules, or reside in other systems (not shown). Further, in addition to embodiments implemented as software modules, embodiments may be implemented as firmware, as hardware, or a combination thereof.

Radar return information is analyzed based upon, in part, signal strength and distance out from the installation vehicle. That is, the radar return information is parsed out into values (signal strength) as a function of distance. The parsed radar returns, based upon their distances out from the installation vehicle, are stored into corresponding range bins in a respective sub-pulse range bin array 130 residing in memory 110. The uncompensated range profile estimate 126 and the compensated range profile estimate 128 are also arrays indexed with respect to range residing in memory 110. The uncompensated range profile estimate 126 is used to store the estimated range profile after stepped frequency processing. The compensated range profile 128 is used iteratively during the stepped frequency ambiguous peaks compensation system to store intermediate and final results of stepped frequency ambiguous peaks compensation system. Any suitable format may be used of the arrays 126, 128, and 130. In alternative embodiments, the arrays 126, 128, and 130 may reside in another memory media.

Figure 2:
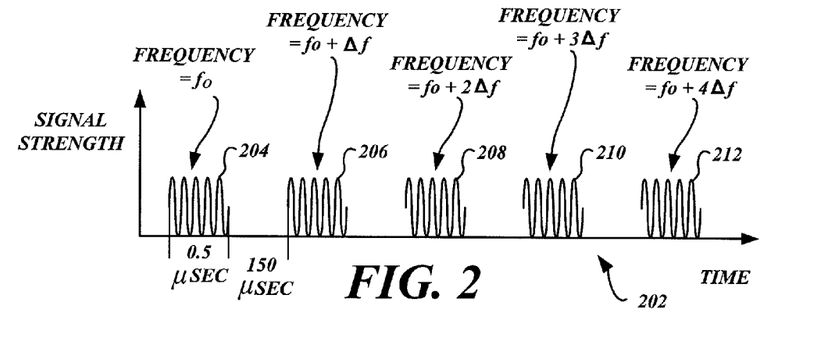
FIG. 2 is a conceptual plot of a stepped frequency pulse-train transmitted from the radar system.

FIG. 2 is a conceptual plot of a stepped frequency pulse-train or waveform 202 transmitted from the transceiver system 106 (FIG. 1). Here, the exemplary pulse-train includes five sub-pulses 204, 206, 208, 210, 212 that are emitted during a relatively short duration of time (not to scale). In an exemplary embodiment, the pulse duration is 0.5 micro ($\mu$) seconds and the pulse separation is 150 micro ($\mu$) seconds (though any suitable pulse duration and separation between sub-pulses may be used by other embodiments). Further, any number of fixed or variable sub pulses, such as seven sub pulses or thirteen sub pulses, may be used.

Each of the sub-pulses 204, 206, 208, 210, 212 have a substantially equal signal strength. Also, each of the sub-pulses 204, 206, 208, 210, 212 have a constant frequency during the pulse. It is appreciated that windowing of the stepped-frequency pulse-train or sub-pulses could be performed in a number of different ways to improve range sidelobe levels.

However, the center frequency for each of the sub-pulses 204, 206, 208, 210, 212 is different. Here, in this exemplary stepped frequency output waveform 202, the frequency of the next adjacent pulse increases by a predefined amount ($\Delta f$). Although it is appreciated that the frequency step between sub-pulses need not be uniform. Thus, the first pulse 204 has an initial predefined frequency of $f_0$. The second pulse 206 has a predefined frequency of $(f_0+\Delta f)$, and so on. Thus, the fifth pulse 212 has a predefined frequency of $(f_0+4\ \Delta f)$. Although it is appreciated that the order frequency stepping is performed in the pulse-train is not necessarily increasing, decreasing, or monotonically changing for a given pulse-train or the same from pulse-train to pulse-train.

Figure 3:
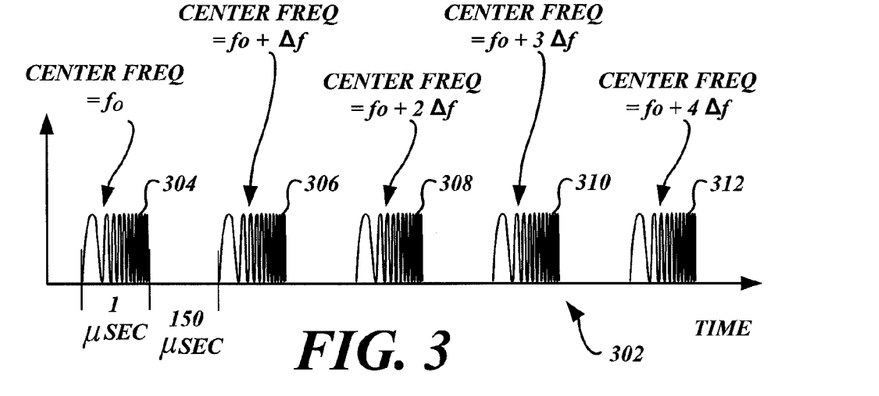
FIG. 3 is a conceptual plot of a pulse compressed stepped frequency pulse-train transmitted from the radar system.

FIG. 3 is a conceptual plot of a pulse compressed stepped frequency pulse-train 302 transmitted from the transceiver system 106 (FIG. 1). Five sub-pulses 304, 306, 308, 310, 312 are emitted during a relatively short duration of time. In an exemplary embodiment, the pulse duration is 1.0 micro ($\mu$) seconds and the sub-pulse separation is 150 micro ($\mu$) seconds (though any suitable pulse duration, separation between sub-pulses, and number of sub-pulses may be used by other embodiments). Each of the sub-pulses 304, 306, 308, 310, 312 have a substantially equal signal strength. Although it is appreciated that windowing of the stepped-frequency pulse-train or sub-pulses could be performed in a number of different ways to improve range sidelobe levels.

In contrast with the waveform 202 of FIG. 2, each of the sub-pulses 304, 306, 308, 310, 312 have modulated frequency content. The frequency modulation may be characterized, in this exemplary embodiment, as a nonlinearly increasing chirp. The series of compressed frequency sub-pulses may be further characterized as each having an increased center frequency wherein the center frequency of each adjacent pulse increases by a predefined amount ($\Delta f$). Although it is appreciated that the step need not be constant. Thus, the first pulse 304 has an initial predefined center frequency of $f_0$. The second pulse 306 has a predefined center frequency of $(f_0+\Delta f)$, and so on. Thus, the fifth sub-pulse 312 has a predefined center frequency of $(f_0+4\ \Delta f)$. In other embodiments, the frequency modulation of the individual sub-pulses 304, 306, 308, 310, 312 and the frequency-stepping of sub-pulse center frequencies may be performed in any suitable manner.

Figure 4:
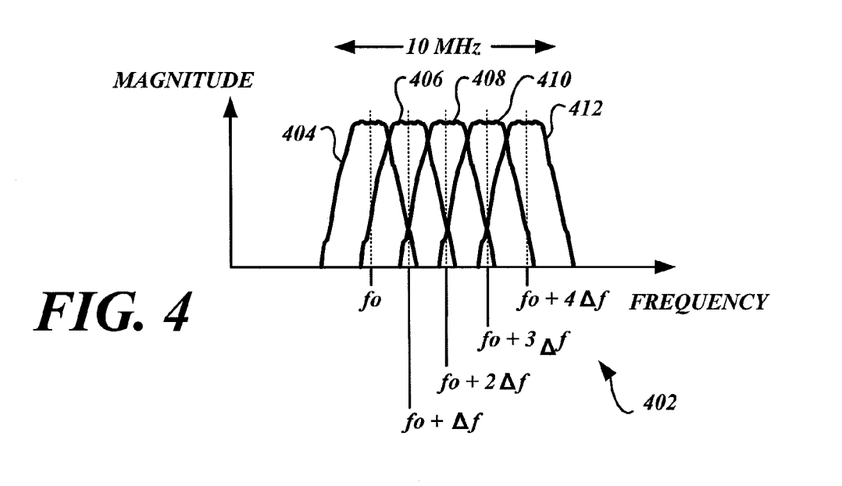
FIG. 4 is a conceptual frequency domain plot of narrow-band spectra of the individual pulse-train sub-pulses and the combined wideband spectra of the estimated range profile.

FIG. 4 is a conceptual frequency domain plot of an estimated range profile 402. For example, for a given stepped-frequency sub-pulse emitted by the transmitter 120, objects along the range profile will reflect incident RF energy back to the transceiver 106 and it will be detected by the receiver 118 and each return will be associated with a time-delay from transmission (and therefore a distance from the transceiver 106 installation) and stored in a the appropriate sub-pulse range bin array 130 in memory 110. The signal return processing module 116, contained in the processing system 104, analyzes the detected radar return and determines the frequency domain of the radar returns. The signal return processing module 116 then applies the appropriate receive filter, stored in memory 110, to the sub-pulse spectra and the result, a narrow band frequency domain range profile estimate, is stored as an array in memory 110. The process is then repeated for each sub-pulse. The signal return processing module 116 then appropriately combines the spectra 404, 406, 408, 410, and 412 resulting in the wide-bandwidth frequency domain of the estimated range profile 402.

The exemplary wideband frequency domain representation of the estimated range profile 402 is a combination of the five narrowband frequency domain range profile estimates 404, 406, 408, 410, 412 determined from the five transmitted sub-pulses (the transmitted sub-pulses 204, 206, 208, 210, 212 of the stepped frequency output waveform 202 of FIG. 2, or the sub-pulses 304, 306, 308, 310, 312 of the pulse compression stepped frequency waveform 302 of FIG. 3). For example, the narrowband frequency domain range profile estimate 404 corresponds to returns processed from the transmitted sub-pulse 204 or 304. The center frequency of each of the narrowband frequency domain range profile estimates 404, 406, 408, 410, 412 corresponds to the center frequencies of the respective emitted sub-pulses. In the exemplary frequency domain plot 402 illustrated in FIG. 4, the bandwidth has been increased significantly compared to the bandwidth of the given individual sub-pulses as a result of using a stepped frequency waveform, which could expand the effective system bandwidth beyond what the transceiver system 106 instantaneously provides.

Figure 5:
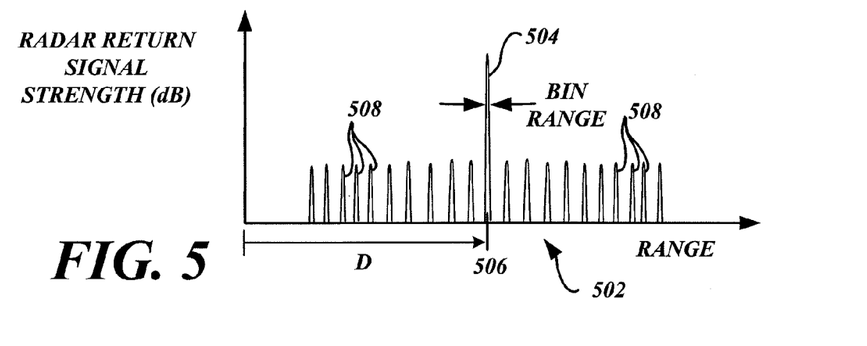
FIG. 5 is a conceptual time domain plot showing the signal strength of an estimated range profile, after pulse compression and stepped frequency processing has been performed, as a function of range over a plurality of range bins.

FIG. 5 is a conceptual time domain plot of an uncompensated range profile estimate 502 showing the signal strength of the radar returns as a function of range. For example, if the embodiment of the stepped frequency ambiguous peaks compensation system 100 is analyzing radar returns in the uncompensated range profile estimate detected by the transceiver system 106, the range corresponds to the distance from the radar transceiver system 106. A relatively strong signal return 504 occurs at a range 506. If the strong signal return 504 is a result of a reflection from an object, then the range 506 corresponds to the distance (D) of the object out from the transceiver system 106 installation.

However, there are a plurality of other signals 508 that appear in the uncompensated range profile estimate 502. The signals 508 may be due to other objects reflecting radar returns back to the radar antenna 122, or the signals 508 may be due to ambiguities introduced by signal processing. If the signals 508 do not correspond to bona fide objects, although the signals 508 have a relatively weaker strength than the signal return 504, such signals 508 would cause the display system 108 to display an unnecessarily cluttered image on the display 124. Thus, it is important for the electronics system 102 to differentiate between bona fide radar returns from objects, and those signals caused by signal processing ambiguities.

As noted above, some of the signals 508 are caused by signal processing ambiguities when a stepped frequency waveform is processed. Such signals 508 are referred to as stepped frequency ambiguous peaks. Similar ambiguities arise when pulse compression techniques are used.

The differences between pulse compression range sidelobes and stepped frequency range ambiguous peaks are subtle because both appear as artifacts on the radar display 124 up and down range of real radar returns if not attenuated, filtered, or otherwise removed. However, pulse compression range sidelobes and stepped frequency range sidelobes are residues of different types of processing and they have different characteristics.

Pulse compression range sidelobes are a bi-product of the convolution (operation preformed by the receive filter) of the received radar returns and the pulse compression receive filter. These range sidelobes extend one uncompressed pulse length on either side of the target and the level of the sidelobes are due to trade-offs made during the waveform and filter design.

Stepped frequency range sidelobes stem from an inability to perfectly re-combine the frequency domain spectra of the individual sub-pulses to exactly represent a wideband range profile estimate. These range sidelobes appear as narrow-range peaks on either side of the target.

When pulse compression and stepped frequency methods are used in conjunction, the ambiguous peaks, occurring in the average envelope of the pulse compressed sub-pulses' ambiguity functions, are often more numerous and pronounced—increasing the need to suppress ambiguous peaks.

Embodiments of the stepped frequency ambiguous peaks compensation system 100 determine the location (range) and predict a power level (signal strength) of the ambiguous peaks due to stepped frequency processing and/or pulse compressed stepped frequency processing contributing to the uncompensated range profile estimate from any given focal range bin. Accordingly, embodiments of the stepped frequency ambiguous peaks compensation system 100 compensate (attenuate, filter, or otherwise remove) the data associated from the undesirable ambiguous peaks such that bona fide radar returns from objects may be identified and their range from the installation determined with a higher degree of accuracy and reliability.

The equation (1) below gives the distance between the ambiguous peaks. Here, the range between ambiguous peaks ($\Delta R$) is given in units of range bins, though any suitable metric may be used (such as time or meters).

$$\Delta R = (\text{speed of light}/2)/\Delta f/(\text{meters per range bin}) \quad \text{Eq. (1)}$$

The speed of light is approximately 300e6 meters/second. The frequency step ($\Delta f$) in Hertz is chosen during design of transmit pulse-trains. The meters per range bin is dependent on the effective bandwidth of the system.

When processing the focal range bin the associated ambiguous peak locations are given by equation (2).

$$AP_x = R_i \pm x \Delta R \quad \text{Eq. (2)}$$

where i=0 . . . max range bin and x=1 . . . number of ambiguous peaks to suppress The signal strength of the ambiguous peaks are predicted based upon the design and/or selection of the matched filter used to receive the radar returns as well as the particular frequency stepping method chosen (increasing, decreasing, un-ordered frequency steps, or any other appropriate method).

In some radar systems, ambiguous peaks may be worsened by uncompensated phase and amplitude errors in the radar system transmitter and receiver (i.e. less predictable ambiguous peak power levels). Accordingly, embodiments of the stepped frequency ambiguous peaks compensation system 100 greatly benefit from a system able to compensate for time varying effects of temperature and the signal deformations occurring in the transmitter 120 and receiver circuitry of the transceiver system 106 (FIG. 1).

As a radar return is analyzed, the signal strength (such as in decibels, dB) for each range (corresponding to a range bin) is determined. The signal strength information is then saved into the appropriate range bin of the appropriate sub-pulse range bin array 130 residing in memory 110 (FIG. 1). To determine the estimate range profile, each sub-pulse in the stepped frequency pulse-train must be transmitted and received separately. For example, once the first sub-pulse is transmitted, the receiver is activated and begins collecting returns until sufficient time has expired for the sub-pulse to make a round trip from the transceiver installation to the maximum range of interest (pulse-train pulse separation time), thus filling a range bin array. The process is then repeated for each sub-pulse in the pulse-train, each cycle filling an additional sub-pulse range bin array 130. The signal processing module 116 is then utilized to move the sub-pulse range bin arrays into the frequency domain with a fast Fourier transform (FFT) and the appropriate receive filter is applied separately to each sub-pulse spectra. Then the signal processing module 116 combines the spectra from the separate sub-pulses intelligently into an uncompensated wideband spectra such as 402. The signal processing module 116 then performs an inverse fast Fourier transform (iFFT) resulting in an uncompensated range profile estimate such as 602. It is at this point in processing that the stepped frequency ambiguous peaks compensation is applied by the ambiguous peaks filtering module 112. Although it is appreciated the algorithm is more efficiently applied after cross range processing, if any, is performed.

As noted above, the location and strength of these ambiguous peaks are predictable for each range bin. Embodiments of the stepped frequency ambiguous peaks compensation system 100, for each range bin, estimate the expected power of ambiguous peaks contributed to the uncompensated range profile estimate post stepped frequency processing given the power in the current focal range bin ($R_i$). Then, the estimated signal strength is subtracted from the compensated range profile estimate at those range bins having locations corresponding to the predicted ambiguous peak locations. This process is repeated for each range bin in the uncompensated range profile estimate array 126. As the estimated signal strength for predicted ambiguous peaks is subtracted out for each of the range bins, the cumulative effect is to attenuate, filter, or otherwise remove artifacts resulting from the processing of the radar returns.

Pseudo code for the method is shown below, however, it is appreciated that the algorithm could be applied to by determining all ambiguous peaks contributing to the power level of a given range bin rather than compensating all range bins corrupted by a returns in a given focal range bin.

```
FOR EACH pulse-train
    compenstatedProfile = uncompensatedProfile;
        FOR i = 1 to number of range bins in uncompensatedProfile
            FOR x = 1 to number of Ambiguous Peaks to suppress
                powCorrupt = uncompensatedProfile(i) – eAmbigPeak(x);
                    FOR a = –1*number adjacent bins to number adjacent bins
                        AP = i + x*ΔR + a;
                        compensatedProfile(AP)= compensatedProfile(AP) –
                        powCorrupt;
                        AP = i – x*ΔR + a;
                        compensatedProfile(AP)= compensatedProfile(AP) –
                        powCorrupt;
                    END
            END
        END
END
```

Where uncompensatedProfile=array of power values, in dB, for the entire range profile estimate which contains both radar returns from bona fide objects and undesirable ambiguous peaks; uncompensatedProfile(i)=power in the current focal range bin $R_i$; compensatedProfile=array of power values, in dB, for the entire range profile estimate which contains radar returns from bona fide objects (ambiguous peaks have been suppressed); AP=range bin index of an ambiguous peak location associated with the current focal range bin; ΔR=range between ambiguous peaks in units of range bins (refer to Eq. 1); eAmbigPeak=expected power of the ambiguous peak in dB—based on known system receive filter; and powCorrupt=estimated power of the ambiguous peak.

For example, a system using pulse compressed stepped frequency pulse-trains might implement a matched pulse compression filter that yields a constant range sidelobe level that is 30 dB below peak, or eAmbigPeak=30 dB. When processing the uncompensated range profile estimate 602 (FIG. 6) with range bin 1 as the focal range bin, uncompensatedProfile(1)=32 dB and eAmbigPeak=30 dB, so powCorrupt=32 dB–30 dB=2 dB. With ΔR=14, the location of the ambiguous peaks for focal range bin 1 are determined to be range bins 15, 29, 43 and 57. To remove the ambiguous peak contribution of focal range bin 1 from the range profile, the power level in range bins 15, 29, 43 and 57 (plus one adjacent range bin on either side of these) are all reduced by 2 dB. Similarly, when range bin 28 is the focal range bin, uncompensatedProfile(28)=72 dB and eAmbigPeak=30 dB, so powCorrupt=72 dB–30 dB=42 dB. To remove the ambiguous peak contribution of focal range bin 28 from the range profile, the power level in range bins 14, 42, 56, 70 and 84 (plus one adjacent range bin on either side of these) are all reduced by 42 dB.

Figure 6:
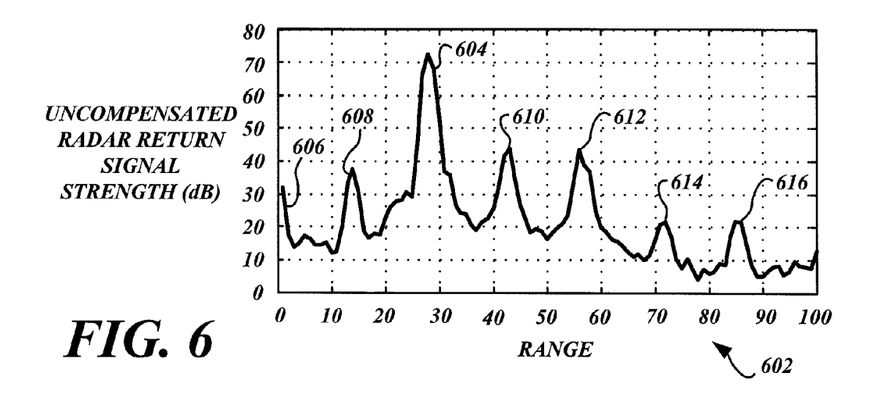
FIG. 6 illustrates a small portion of an estimated range profile collected from actual radar returns plotted with signal strength as a function of range.

FIG. 6 illustrates a small portion of an uncompensated range profile estimate 602 collected from real radar returns by a prototype system. The range is illustrated as a function of the range bin number. Thus, the range extends from a first range bin out to range bin 100. It is appreciated that the physical area these range bins represent is dependent on the effective bandwidth of the radar after stepped frequency processing and the sub-pulse separation interval chosen by the designer. The plot is displayed in terms of signal strength, in decibels (dB), as a function of range. The portion of estimated range profile 602 shown has a plurality of discernable peaks 604, 606, 608, 610, 612, 614, 616. Prior to applying the stepped frequency ambiguous peaks compensation method, it is unclear which peaks are a result of reflections from bona fide objects or which peaks are artifacts resulting from the stepped frequency method. However, in this example, it is known that true range profile has a buoy reflecting returns associated with range bin 28. There are no other bona fide targets in the true profile.

Figure 7:
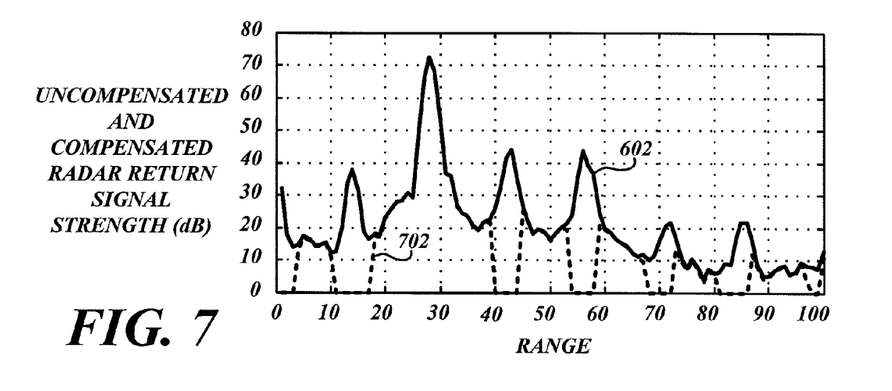
FIG. 7 is a plot of the uncompensated range profile estimate superimposed over the compensated range profile estimate in the range domain.

FIG. 7 shows the same portion of the estimated range profile 602 as well as the estimated range profile 702 after the ambiguous peak compensation algorithm is applied resulting in a substantially improved estimate of the true range profile. It is appreciated that additional thresholds could now be applied to further improve the eventual radar image, but care should be taken not to clip weak targets. For example, an assumption might be made that any signal strength less than 22 dB may be attributed to noise (rather than a radar return from a bona fide object). If all range bins having a signal strength of 22 dB or less are nulled out, then only the peak 604 centered about range bin 28 remains. It is appreciated that this example represents a relatively simple range profile for illustration and the algorithm performs similarly well in complex scenes.

After the stepped frequency ambiguous peaks compensation is applied, the display processing module 114 retrieves the information from the compensated range profile estimate array 128, and constructs a radar image therefrom. The radar image is then communicated to display system 108 such that an image of "objects" about the installation are presented on the display 124. Embodiments of the stepped frequency ambiguous peaks compensation system 100 suppress the ambiguous peaks due to stepped frequency methods such that the radar image on the display indicates the location of bona fide objects that have reflected radar returns. That is, artifacts (associated with stepped frequency) that would otherwise clutter the radar image are not displayed.

In the prototyped stepped frequency ambiguous peaks compensation system 100 which generated the compensated range profile estimate 702, one adjacent range bin on either side of the predicted ambiguous peak range bin was compensated (pseudo code: number adjacent bins=1 or FOR a=–1, 0, 1) This choice was based upon empirical testing of the algorithm on actual radar data. The number of range bins adjacent to a range bin with power levels contributed to by an ambiguous peak can be adjusted without the departing from the spirit of the invention. In other embodiments, compensation is not performed on range bins adjacent to a range bin determined to have power levels contributed to by an ambiguous peak. In other embodiments, the range bin width used for compensation is a predefined number of range bins. For example, but not limited to, five range bins may be compensated (one range bin associated with the center point of a predicted ambiguous peak, and two adjacent range bins on either side) for each predicted ambiguous peak. In yet further embodiments, the number of adjacent range bins to be compensated and/or the predicted levels of ambiguous peaks is adjusted dynamically based on user adjustments, or autonomous metrics of system performance.

The number of ambiguous peaks for which the location is determined and the signal strength is predicted may be determined in a variety of manners. In some embodiments, the number of ambiguous peaks per range bin that are compensated for are predetermined. In other embodiments, the number of ambiguous peaks per range bin are determined during run-time. In one exemplary embodiment, the number of ambiguous peaks compensated for a given focal range bin return is based on the power level of that focal range bin.

In other embodiments the Doppler detected in the focal range bin is used to adjust the predicted power of a given ambiguous peak associated with the focal bin and the number of adjacent range bins compensated for a given range bin with power contributed to by an ambiguous peak. Then, compensation is performed for those range bins. Thus, changes in predicted ambiguous peak's power levels and widths can be accounted for.

The above-described embodiment of the stepped frequency ambiguous peaks compensation system 100 was described as starting the compensation process at the first range bin (range bin 1). Signal strength components associated with predicted ambiguous peaks from returns at each processed focal range bin was subtracted as each focal range bin was serially processed. The compensation process was completed after the last range bin (range bin 100) was processed. In other embodiments, the range bins are processed in a different order (such as, but not limited to, starting with range bin 100 and progressing towards range bin 1). Further, the algorithm may be applied only to range bins with power levels above a threshold determined at run-time or a priori by the designer. Additionally, the algorithm could be applied to a reduced subset of focal range bins—such as every other bin. However, performance would be expected to degrade.

Embodiments of the stepped frequency ambiguous peaks compensation system 100 are described in terms of a radar that emits a plurality of stepped frequency pulses and that analyzes radar returns from objects. In other embodiments may be implemented in other types of devices that utilize stepped frequency processing to expand effective bandwidth of the device. Including, but not limited to active remote sensing technologies such as sonar (or any acoustic imaging device) and LIDAR. In such embodiments, a signal source emits a plurality of stepped frequency pulses, which may be optionally frequency compressed or otherwise processed as long as frequency content is preserved. It also could be applied to wideband communication systems that utilize a multitude of narrowband hardware systems working in parallel to assemble an estimate of a wideband signal.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for compensating for ambiguous peaks in an estimated range profile, the method comprising:
    determining an uncompensated range profile estimate using a stepped frequency process based upon an emitted stepped frequency pulse-train comprising a plurality of sub-pulses, wherein a center frequency between adjacent sub-pulses in the stepped frequency pulse train is different;
    determining, for each of a plurality of focal range bin signal strengths, an associated predicted power level a plurality of ambiguous peaks introduced to the range profile estimate;
    determining an expected range bin location corrupted by the ambiguous peaks with the predicted power levels;
    generating a compensated range profile estimate based upon the uncompensated range profile estimate; and
    iteratively updating the compensated range profile estimate as the predicted power levels contributed to determined range bins are adjusted for each focal range bin, wherein the method further comprises:
    determining relative location of a plurality of adjacent side lobe range bins based upon an estimated width of contributions by the plurality of ambiguous peaks; and
    determining the expected range bin locations of contributions due to the plurality of ambiguous peaks.

2. The method of claim 1, further comprising:
    determining relative location of a plurality of adjacent range bins in the compensated range profile estimate associated with a given ambiguous peak, the adjacent range bins located adjacent to the side lobe range bin;
    determining the size of correction to be applied to an adjacent range bin signal in the compensated range bin profile;
    retrieving a range bin signal strength for each of the plurality of range bins that correspond to an adjacent side lobe range bin from the compensated range profile estimate;
    reducing the current range bin signal strength by the determined size of correction; and
    storing the reduced current range bin signal strength as a new range bin signal strength in the compensated range profile estimate.

3. The method of claim 1, further comprising:
    determining the estimated range profile from received signal returns reflected from a true range profile, the signal returns generated by the stepped frequency pulse-train emitted by a signal source.

4. The method of claim 1, wherein the emitted stepped frequency pulse train is a pulse compressed stepped frequency pulse-train.

5. The method of claim 1, further comprising:
    determining the estimated range profile from received signal returns reflected from a true range profile, the signal returns generated by a pulse compressed stepped frequency pulse-train emitted by a signal source.

6. The method of claim 5, further comprising:
    emitting the pulse compressed stepped frequency pulse-train from the signal source.

7. The method of claim 1, wherein each range bin is defined by its unique distance from a signal source and a bin depth, and wherein the plurality of range bins define a continuous distance out from the signal source.

8. The method of claim 1, wherein the signal source is a radar.

9. The method of claim 1, wherein the estimated range profile is based upon the stepped frequency processing.

10. A method for compensating for ambiguous peaks in an estimated range profile, the method comprising:

determining an uncompensated range profile estimate using a stepped frequency process based upon an emitted stepped frequency pulse-train comprising a plurality of sub-pulses, wherein a center frequency between adjacent sub-pulses in the stepped frequency pulse train is different;

determining, for each of a plurality of focal range bin signal strengths, an associated predicted power level a plurality of ambiguous peaks introduced to the range profile estimate;

determining an expected range bin location corrupted by the ambiguous peaks with the predicted power levels;

generating a compensated range profile estimate based upon the uncompensated range profile estimate; and iteratively updating the compensated range profile estimate as the predicted power levels contributed to determined range bins are adjusted for each focal range bin wherein the method further comprises:

identifying a number of ambiguous peaks polluting the compensated range profile estimate associated with each focal range bin in the uncompensated range profile estimate predicting a power level of each ambiguous peak based on the power of the current focal range bin in the uncompensated range profile estimate, based upon a distance of each ambiguous peak from the focal range bin;

determining the relative location of a bin with power levels contributed to by a given ambiguous peak from the location of the focal range bin in the uncompensated range profile estimate, wherein the relative location of the current ambiguous peak bin is based on the Δf of the stepped frequency pulse-train;

retrieving a corresponding signal strength of the range bin from the compensated range profile estimate;

reducing the retrieved range bin signal strength by the predicted ambiguous peak power level; and storing the reduced range bin signal strength back in the compensated range profile estimate.

11. The method of claim 10, wherein the predicting, the determining, the retrieving, the reducing, and the storing are performed for each one of the plurality of focal range bins in the uncompensated range profile estimate.

12. The method of claim 10, wherein upon completion of the predicting, the determining, the retrieving, the reducing, and the storing for each one of the plurality of range bins, further comprising:

generating a display image based upon the plurality of compensated range bin signal strengths.

13. A signal compensation system for compensating a signal return reflected from a range profile, wherein the signal returns correspond to a stepped frequency pulse-train emitted from a signal source, comprising:

a memory configured to store multiple range profile estimates each consisting of a plurality of range bin signal strengths in a plurality of range bins, the plurality of range bin signal strengths determined from the signal returns, wherein each range bin corresponds to a unique distance from the signal source, wherein the emitted stepped frequency pulse-train comprises a plurality of sub-pulses, and wherein a first center frequency of a first sub-pulse is different from a second center frequency of an adjacent second sub-pulse in the stepped frequency pulse train; and a processing system configured to:

determine a range profile estimate consisting of a plurality of range bin signal strengths for the signal return at the plurality of range bins;

communicate the determined range profile estimate to the memory for storage as a uncompensated range profile estimate and to communicate the determined range profile estimate to the memory for storage as compensated range profile estimate, wherein the compensated range profile estimate is initially a duplicate of the uncompensated range profile estimate;

determine an ambiguous peak range bin location of an ambiguous peak associated with a focal range bin signal strength in the uncompensated range profile estimate;

predict the size of the ambiguous peak signal strength in the compensated range profile estimate due to the focal range bin in the uncompensated range profile estimate;

determine the expected range bin locations of contributions due to a given ambiguous peak;

determine relative location of a plurality of adjacent side lobe range bins based upon an estimated width of contributions by the given ambiguous peak;

retrieve a current range bin signal strength for one of the plurality of range bins that corresponds to an ambiguous peak range bin in the compensated range profile estimate; and reduce the current range bin signal strength by the predicted ambiguous peak signal strength; and communicate the reduced current range bin signal strength as a new current range bin signal strength in the compensated range profile estimate to the memory for storage.

14. The signal compensation system of claim 13, further comprising:

a radar receiver configured to receive the signal return through the antenna.

15. The signal compensation system of claim 14, further comprising:

a transmitter configured to emit the stepped frequency pulse-train from the antenna.

16. The signal compensation system of claim 13, wherein the emitted stepped frequency pulse train is a pulse compressed stepped frequency pulse-train.

17. A method to compensate an estimated range profile, wherein a signal return corresponds to a true range profile illuminated by a stepped frequency pulse-train emitted from a signal source, comprising:

detecting the signal return based upon the emitted stepped frequency pulse-train, wherein the emitted stepped frequency pulse-train comprises a plurality of sub-pulses, and wherein a first center frequency of a first sub-pulse is different from a second center frequency of an adjacent second sub-pulse in the stepped frequency pulse train;

determining a plurality of range bin signal strengths for the signal return at a plurality of range bins, each range bin corresponding to a unique distance from the signal source;

for each of the plurality of range bins, determining range bins corrupted by ambiguous peaks due to a stepped-frequency processing method;

for each of the plurality of range bins in the estimated range profile, predicting the power levels of the associated ambiguous peaks in the respective range bins corrupted due to the stepped frequency processing method;

for each of the plurality of range bins in the compensated range profile estimate corrupted by the ambiguous peaks due to a respective focal range bin in the uncompensated range profile estimate, determining the range bin signal strength;

for each of the plurality of the range bin signal strengths corrupted by the ambiguous peaks, retrieving range bin signal strength from the compensated range profile estimate, wherein each of the current range bin signal strengths corresponds to one of the range bins corrupted by a corresponding ambiguous peak; and for each of the plurality retrieved range bin signal strengths corrupted by the ambiguous peaks corresponding to the signal strength in the current focal range bin of the uncompensated range profile estimate, reducing the range bin signal strength by the predicted level of the given ambiguous peak; and overwriting each of the reduced current range bin signal strengths in the compensated range profile estimate, wherein the method further comprises:

determining the expected range bin locations of contributions due to a given ambiguous peak; and determining relative location of a plurality of adjacent side lobe range bins based upon an estimated width of contributions by the given ambiguous peak.

18. The method of claim 17, further comprising:
generating the stepped frequency pulse-train.

19. The method of claim 17, wherein the emitted stepped frequency pulse train is a pulse compressed stepped frequency pulse-train.

* * * * *